(12) United States Patent
Maalioune et al.

(10) Patent No.: US 8,991,151 B2
(45) Date of Patent: Mar. 31, 2015

(54) ACTUATOR SYSTEM FOR A MOBILE PANEL OF A NACELLE OF A TURBOJET

(75) Inventors: Hakim Maalioune, Orgeval (FR);
Vincent Le-Coq, Saint Romain-de-Colbosc (FR); Fernand Rodriguez, Felzins (FR); Pierre Moradell-Casellas, Saint Georges des Groseillers (FR)

(73) Assignees: Aircelle, Gonfreville L'Orcher (FR);
Sagem Defense Securite, Paris (FR)

( * ) Notice: Subject to any disclaimer, the term of this patent is extended or adjusted under 35 U.S.C. 154(b) by 684 days.

(21) Appl. No.: 13/264,890

(22) PCT Filed: Apr. 7, 2010

(86) PCT No.: PCT/FR2010/050666
§ 371 (c)(1),
(2), (4) Date: Oct. 17, 2011

(87) PCT Pub. No.: WO2010/119210
PCT Pub. Date: Oct. 21, 2010

(65) Prior Publication Data
US 2012/0031995 A1 Feb. 9, 2012

(30) Foreign Application Priority Data
Apr. 16, 2009 (FR) ...................................... 09 52506

(51) Int. Cl.
*F02K 1/76* (2006.01)
*F02K 3/02* (2006.01)
(Continued)

(52) U.S. Cl.
CPC . *F02K 1/763* (2013.01); *F02K 1/76* (2013.01);
*B64D 33/04* (2013.01); *F02K 1/72* (2013.01)
USPC ...................... 60/226.2; 60/226.3; 244/110 B (58) Field of Classification Search
CPC ............ F02K 1/763; F02K 1/766; F02K 1/70
USPC ............................................... 60/226.2, 226.3
See application file for complete search history.

(56) References Cited

U.S. PATENT DOCUMENTS 4,960,243 A * 10/1990 Dubois et al. ............ 239/265.29
5,090,197 A * 2/1992 Dubois ......................... 60/226.2
5,267,438 A * 12/1993 Bunel et al. .................. 60/226.2
(Continued)

FOREIGN PATENT DOCUMENTS

EP 0843089 A1 5/1998
EP 1413737 A1 4/2004
(Continued)

OTHER PUBLICATIONS

International Search Report PCT/FR2010/050666; Dated Jul. 21, 2010.

*Primary Examiner* — William H Rodriguez
*Assistant Examiner* — Rene Ford
(74) *Attorney, Agent, or Firm* — Brinks Gilson & Lione (57) ABSTRACT

The invention relates to a system for actuating a plurality of actuators (15) that can move a mobile panel of an aircraft nacelle. Said system comprises at least two motors (16) that can drive the actuators (15), the two motors (16) being controlled and supplied by at least two separate control units (33, 35), and the actuators (15) being mechanically interconnected by a mechanical transmission (37). The invention also relates to a nacelle comprising such an actuating system.

14 Claims, 4 Drawing Sheets

(51) Int. Cl.
*B64D 33/04* (2006.01)
*F02K 1/72* (2006.01)

(56) References Cited

U.S. PATENT DOCUMENTS

| | | |
|---|---|---|
| 6,439,504 B1 | 8/2002 | Ahrendt |
| 7,370,468 B2 * | 5/2008 | Colotte et al. ............... 60/226.2 |
| 7,946,106 B2 * | 5/2011 | Dehu et al. .................. 60/226.2 |
| 8,650,855 B2 * | 2/2014 | Maalioune ................... 60/226.2 |
| 2007/0237575 A1 | 10/2007 | Dilno |
| 2010/0107598 A1 * | 5/2010 | Marin Martinod et al. .. 60/226.2 |
| 2011/0088369 A1 * | 4/2011 | Maalioune et al. ............ 60/204 |

FOREIGN PATENT DOCUMENTS

| | | | |
|---|---|---|---|
| FR | 2934327 A1 | 1/2010 | |
| GB | 1421153 A * | 1/1976 | |
| GB | 2372729 A * | 9/2002 | ................ F02K 1/46 |
| WO | 03023449 A1 | 3/2003 | |
| WO | WO 2010066957 A1 * | 6/2010 | |

* cited by examiner

ACTUATOR SYSTEM FOR A MOBILE PANEL OF A NACELLE OF A TURBOJET

TECHNICAL FIELD

The present invention relates to an actuator system for a plurality of actuators able to move a mobile panel belonging to an aircraft nacelle.

BACKGROUND

Aircraft nacelles are intended to house a turbojet engine, which can be a two-flow jet engine capable of generating a hot air flow (also called primary flow) from the combustion chamber of the turbojet engine, and a cold air flow (secondary flow) from the fan that circulates outside the turbojet engine through an annular channel, also called "stream," formed between a fairing of the turbojet engine and an inner wall of the nacelle. The exhaust section of the secondary flow is called "secondary nozzle" while the exhaust of the primary flow is done in the primary nozzle. At the rear of the nacelle, the two primary and secondary flows mix.

This nacelle can be smooth or can be equipped with a thrust reverser device that, during landing, makes it possible to improve its braking capacity by reorienting at least part of the thrust generated by the turbojet engine towards the front. In this phase, the reverser obstructs the gas jet nozzle and orients the exhaust flow from the engine towards the front of the nacelle, thereby generating a counter-thrust that is added to the braking of the airplane's wheels.

In this perspective, the thrust reverser comprises a varied thrust reverser means, such as in general at least one mobile cowl, called "thrust reverser cowl," moving in translation owing to actuators in a direction substantially parallel to a longitudinal axis of the nacelle. Thus, the mobile cowl(s) can alternatively go from a closing position in which the thrust reverser cowl(s) ensure(s) the aerodynamic continuity of the nacelle, to an open position in which a passage is revealed on a stationary structure of the nacelle to reverse the secondary flow.

Moreover, the nacelle can comprise an additional device allowing a variation of the exhaust section of the secondary nozzle. Such a device is commonly designated as a variable nozzle and can be associated with a thrust reverser device or can be incorporated into a smooth nacelle.

Although several variable nozzle embodiments exist, it is known to use, as device, a multitude of nozzle flaps able to pivot inside the stream so as to vary the width thereof. In this way it is possible to adapt the exhaust section of the second nozzle, so as to optimize the specific consumption of the turbojet engine or reduce the ejection noise of the gases depending on the flight phases.

One particular example is the embodiment described in French patent application 08/04295, where the nozzle flaps are situated at the output of the stream and also serve to produce a secondary nozzle variation during a limited translation of the thrust reverser cowl(s).

The nozzle flaps and the thrust reverser cowls constitute mobile panels. The movement of such panels is ensured by a plurality of actuators.

The actuators can assume different forms, in particular electromechanical actuators like those described in document EP 0 843 089.

This type of actuator is associated with an actuator system comprising at least one motor able to drive said actuators. The actuator system is intended in particular to mechanically actuate the actuators.

The availability of the thrust reverser and secondary nozzle section varying systems is an important consideration and constitutes one major area of development for electromechanical actuators.

The availability criterion refers to the capacity for the mobile panels of the thrust reverser and/or variable nozzle device to be deployed so as to fulfill their function and prevent operation in deteriorated mode. It requires an average redundancy level, without, however, severely damaging the reliability of the entire device, and an appropriate architecture to minimize the common modes such as mechanical blocking.

BRIEF SUMMARY

One aim of the present invention is therefore provide a system for actuating a plurality of actuators able to move a mobile panel having great availability.

To that end, according to a first aspect, the invention relates to a system for actuating a plurality of actuators that can move a mobile panel of an aircraft nacelle, said system comprising at least two motors that can drive the actuators, characterized in that the two motors are controlled and supplied by at least two separate control units, and in that the actuators are mechanically interconnected by a mechanical transmission.

The present invention makes it possible to preserve the operation via the mechanical transmission of the thrust reverser and/or the secondary section variation system when one of the two control units no longer works. The transmission is ensured for part of the electrical motors, which then drives the actuators to which they are connected which, in turn, drive the actuators not powered by a motor via the mechanical transmission. Thus, the availability of the thrust reverser is increased.

According to other features of the invention, the inventive system includes one or more of the following optional features considered alone or according to all possible combinations:

the mechanical transmission includes one or more flexible power cables;
each actuator is driven directly by a motor;
a single actuator or part of the actuators is driven by all of the motors, the other actuators being driven by one or more mechanical transmissions;
the two control units are powered by two distinct electrical power systems;
each unit can deliver sufficient power for a single motor or set of motors connected to the control unit to be able to drive all of the actuators;
the motors are electrically synchronized. One example of an electrical synchronization method is described in application FR 08/03157 filed on Jun. 6, 2008 and not yet published.
each control unit includes a control device commanding at least one inverter able to control one or more motors.

According to another aspect, the invention relates to a nacelle for a two-flow jet engine having an outer structure defining an annular flow channel for the cold air flow, said outer structure comprising at least one mobile panel equipped with an actuator system according to the invention. According to one embodiment, the mobile panel is a thrust reverser cowl able to move substantially longitudinally.

The mobile panel can be a nozzle flap pivotably mounted so as to reduce the width of the annular channel.

According to still another advantageous embodiment, the nacelle includes at least one thrust reverser cowl and at least one nozzle panel.

The nacelle can advantageously include a plurality of mobile panels connected to each other by a mechanical connection so as to allow a substantially synchronized movement of said mobile panels relative to each other.

The motors of a mobile panel can advantageously be synchronized in position with the motors of another mobile panel by a synchronization means controlled by the control units.

BRIEF DESCRIPTION OF THE DRAWINGS

The invention will be better understood upon reading the following non-limiting description, done in reference to the appended figures.

DETAILED DESCRIPTION

Figure 1:
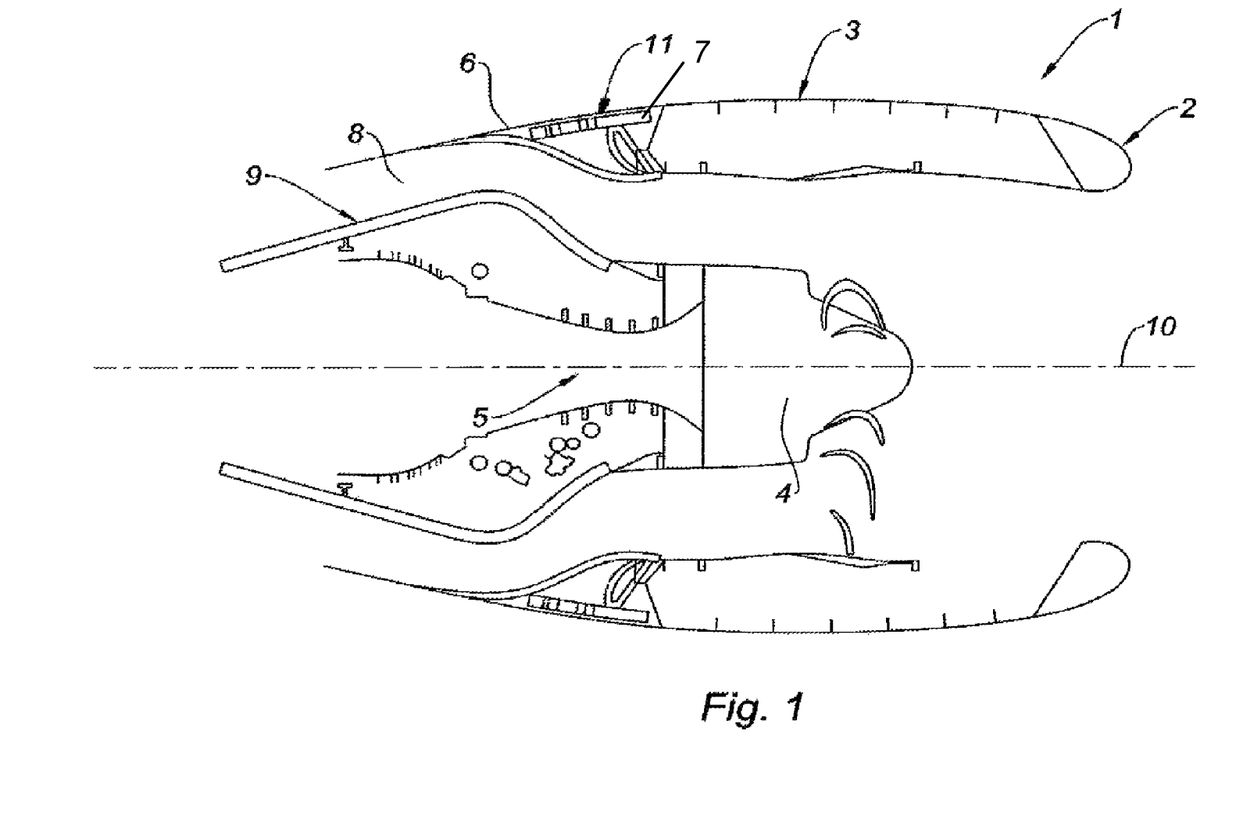
FIG. 1 is a diagrammatic longitudinal cross-sectional illustration of a first embodiment of a nacelle according to the invention.
Figure 2:
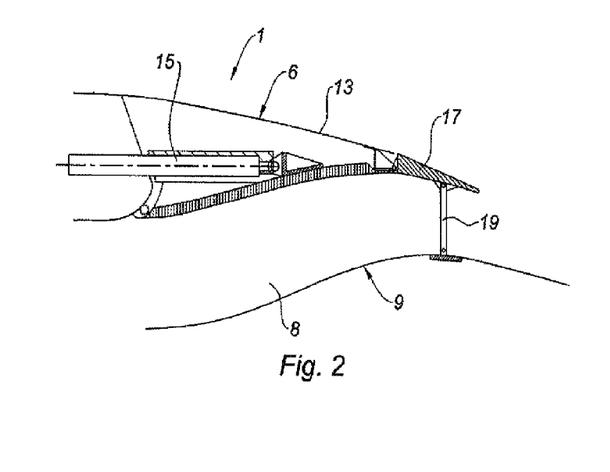
FIGS. 2 and 3 are longitudinal cross-sections of the downstream section of the inventive nacelle.

According to the embodiment illustrated in FIG. 1, a nacelle 1 according to the invention comprises an upstream air intake structure 2, a middle structure 3 surrounding a fan 4 of a turbojet engine 5, and a downstream structure. The downstream structure includes, in a known manner, an outer structure 6, called OFS, housing a thrust reverser means 7, and an inner structure 9, called IFS, intended to cover the downstream part of the turbojet engine 5. The nacelle 1 is fixed downstream using any suitable means, in particular connecting rods, to a suspension pylon, not shown, intended to attach the nacelle 1 under an aircraft wing.

The outer structure 6 and the inner structure 9 define an annular flow channel 8 for the cold air flow.

The inner structure 9 is intended to cover a downstream section 11 of the turbojet engine extending downstream of the fan. The downstream section 11 can be equipped with a thrust reverser, such as a grid thrust reverser.

In this case, the outer structure 6 comprises at least one thrust reverser cowl 13 mounted translationally along a substantially longitudinal axis 10 of the nacelle 1 between a closed position, in which the thrust reverser cowl(s) 13 ensure(s) the aerodynamic continuity of the nacelle 1, and an open position, in which the thrust reverser cowl(s) 13 free(s) an opening in the nacelle 1 while revealing a reverser means for the cold flow (typically reverser grids, not referenced but visible at the rear of the actuator 15).

According to one alternative, the nacelle 1 can include one or two, or even more than two thrust reverser cowls. Moreover, the thrust reverser cowls can be connected to each other so that the movement of one of the cowls 13 causes the movement of the other cowls 13.

The outer structure 6, and in this case the thrust reverser cowls 13, is extended by a nozzle section comprising a plurality of nozzle flaps 17 mounted at a downstream end of said thrust reverser cowl 13.

Figure 3:
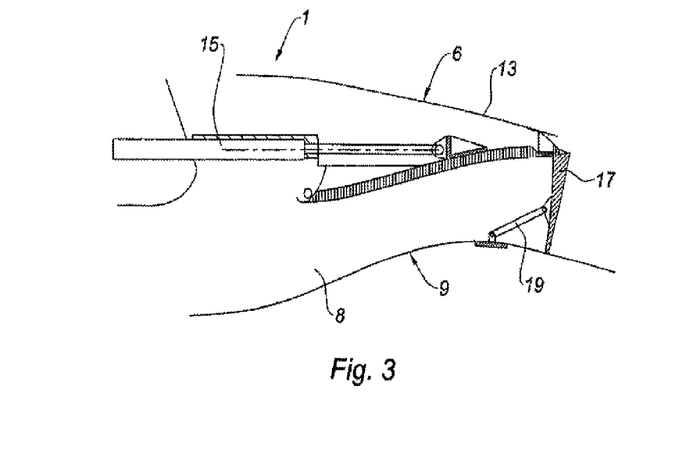

Each nozzle flap 17 is for example pivotably mounted by a connecting rod 19 allowing the flap 17, by moving, to decrease the width of the annular channel 8 at least in part, or in whole (see FIG. 3).

Thus, when the thrust reverser cowl 13 is opened, it rotates the nozzle flap 17, which then at least partially obstructs the channel 8 and thus optimizes the reversal of the cold air flow.

Thus, the thrust reverser cowls 13 and the nozzle flaps 17 constitute mobile panels that can be moved by a plurality of actuators 15.

Figure 4:
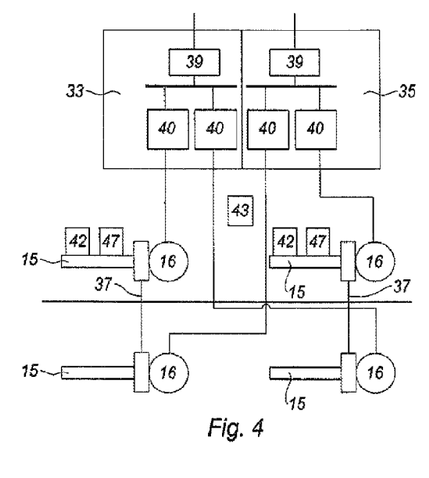
FIGS. 4 and 5 are an example of an embodiment of the actuator system according to the invention associated with a pair of mobile panels.
Figure 5:
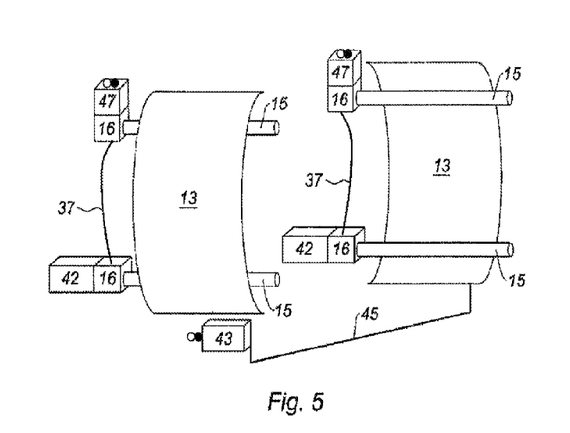

According to the embodiment of FIGS. 4 and 5, each cowl 13 is equipped with two actuators of the electrical type each powered by an electrical motor. An electrical actuator 15 can assume the form of a jack mounted on the fixed structure (front frame) of the outer structure 6. According to one alternative, the number of actuators 15 on a mobile panel 13, 17 can be greater than two, or equal to three, four or more.

The nacelle 1 can include a control system making it possible to control the movement of the actuators 15 of a mobile panel.

Said control system comprises at least two motors 16 that can drive said actuators 15 (see FIGS. 4 and 5).

According to one preferred embodiment, each actuator 15 can be connected to a motor 16 specific to it.

According to another alternative, part of the actuators can be connected to more than two motors, the other actuators then being connected to said part of the actuators so that they can be driven.

The control system also includes two distinct control units 33, 35, each unit 33 and 35 being configured to control and power at least one motor 16 neither powered nor controlled by the other control unit 35 and 33.

Advantageously, if one control unit 33 or 35 no longer works, the other control unit 35 or 33 still powers the motors 16 connected to it. As a result, the mobile panel 13, 17 is driven by the actuator(s) 15 whereof the motor 16 is still powered.

Thus, the availability of the thrust reverser means is increased inasmuch as, in the event one unit malfunctions 33, 35, the mobile panel 13, 17 is driven by at least one actuator 15.

Moreover, the nacelle 1 has only two control units 33 and 35 to power all of the motors 16 and no longer one control unit per motor. Thus, the bulk due to the power supply of said motors 16 is reduced.

According to one embodiment, the motors 16 are all mechanically connected to each other, for example by flexible cables ("flexshaft"). Advantageously, when a breakdown occurs at a control unit 33 or 35, all of the actuators 15 are driven by the mechanical transmission.

According to the invention, the nacelle 1 includes an actuating system configured to actuate the actuators 15. Said system comprises the motors 16 powered by the two power supply units 33 and 35 and able to drive said actuators 15. The actuators 15 are also mechanically connected to each other by a mechanical transmission 37. Thus, in the event of a malfunction of a unit 33 or 35, the motor(s) 16 driven by the other unit 33 or 35 is (are) sufficient to actuate all of the actuators 15 to move the mobile panel 15.

The mechanical transmission 37 is typically chosen to minimize the actuation delay of the two remaining motors 16 in case of breakdown. As a result, the delay between the actuators 15 of a mobile panel is reduced.

The mechanical transmission 37 can include one or more flexshafts to allow easy installation in the nacelle.

According to one embodiment, a single actuator or part of the actuators is configured to be driven by all of the motors, the other actuators being driven by one or more mechanical transmissions.

Preferably, each unit 33, 35 can deliver sufficient power for a single motor 16 to be able to drive all of the actuators 15 of an assembly connected by a mechanical transmission. Thus, the availability of the thrust reverser means is still further increased.

Usually, additional synchronization transmission hoses or shafts are needed to transmit the power or synchronize the positions of the actuators. A nacelle computer able to collect data from the turbojet engine 5 and the nacelle 1 can also synchronize the control of the position of the motors 16 via an electrical command to do away with the synchronization hoses. Thus, it is no longer necessary to adjust these hoses relative to each other upon each locking of the mobile panels 13, 17 during maintenance, which makes it possible to save time.

The control units 33 and 35 can be grouped together within a main entity. According to one alternative, the control units 33 and 35 can be separated and powered each by a power source, the power sources being independent of each other. In this way, it is possible to minimize the risk of breakdown of the two units, in particular in the event of a short circuit-type breakdown.

Preferably, each control unit 33 and 35 includes a control device 39 controlling at least one inverter 40 powering one or more motors 16 (not shown). The control device 39 makes it possible to control and manage the power of the rectifier up to each inverter 40.

In the event each inverter 40 powers one motor 16, the motors 16 are then controlled independently. Thus, if one inverter 40 is no longer working, the non-powered motor 16 is driven by the other motor 16 of the pair of actuators via the mechanical transmission 37.

The nacelle 1 can include a means for controlling the speed of each motor 16 able to correct said speed of the latter. Thus, it is possible to control the speed of each motor 16 so as to allow a homogenous movement of the thrust reverser cowls 13.

Typically, the control means corresponds to a position measuring member for example comprising a "resolver" and continuously delivering at least one value making it possible to determine the position of the motor and control it. More specifically, a "resolver" is an angular position sensor whereof it is possible to calculate a position relative to a chosen fixed reference. It is possible to attach a "resolver" or "LVDT" linear angular position measuring device to have a precise absolute measurement of the position of the actuator, in particular the jack shaft, at the mobile panel.

Advantageously, the position members as well as the revolution counters of an actuator 15 can also each be powered by one of the two control units 33 or 35.

Moreover, the nacelle 1 can include an electrical synchronization means for the motors 16 relative to each other so as to guarantee a substantially synchronized movement of the mobile panels 13, 17 relative to each other.

As a result, the risk of one thrust reverser cowl 13 moving faster than the other, which could unbalance the aircraft in the thrust reverser configuration, is limited.

In the event of a breakdown of a control unit 33 or 35 or of an inverter 40, the positioning error of the actuators 15 and therefore of the mobile panels 13, 17 is made minimal enough to be tolerated by the turbojet engine 5.

As an example, the electrical synchronization means can enable a mixed torque-position enslavement in order to optimize the control and smooth any power withdrawal.

For example in the acceleration and deceleration phases, the motor 16 can be steered based on a torque enslavement preponderantly with an overspeed limitation, while the speed-stabilized phases can be done by regulating the speed and torque limitation.

Advantageously, in the embodiments shown in FIGS. 4 and 5, the elements making it possible to vary the section of the annular channel 8 and also the elements allowing the thrust reversal can be grouped together.

According to one embodiment, the control system includes a locking means able to lock the actuators 15 in their travel or end of travel. The locking means can be in the form of bolts that can be assembled.

As indicated above, two types of bolts exist. Typically, the first type is made up of primary and secondary bolts 42 are [sic] each arranged on actuators 15 of a mobile panel. The second type is formed by one or more tertiary bolts 43, isolated relative to the mobile panels 13, 17 but connected to the latter via a structural connection 45.

Typically, this tertiary bolt 43 is positioned at 6:00 relative to the mobile panels 13, 17, in particular the thrust reverser cowl 13. The 6:00 direction is considered relative to the nacelle 1 when it is mounted on a wing of an aircraft and seen by the upstream air intake structure 2.

In parallel, locking means 47, or "secondary nozzle brakes," exist making it possible to lock or control the flaps 17 in a position ensuring the total or partial closure of the annular channel 8, for example via actuators. There are typically two of these brakes 47 each arranged on a mobile panel 13, 17.

According to the embodiment shown in FIG. 4, the primary and secondary bolts 42 and the nozzle brakes 47 of a same mobile panel can be arranged on different actuators 15, in particular two different actuators.

According to an alternative shown in FIG. 5, the primary and secondary bolts 42 and the nozzle brakes 47 of a same mobile panel can be arranged on a same actuator.

Each control unit 33 or 35 can house other functions such as the deicing control of the air intake lip 2 and also the electronic control of the primary and secondary bolts 42.

Figure 6:
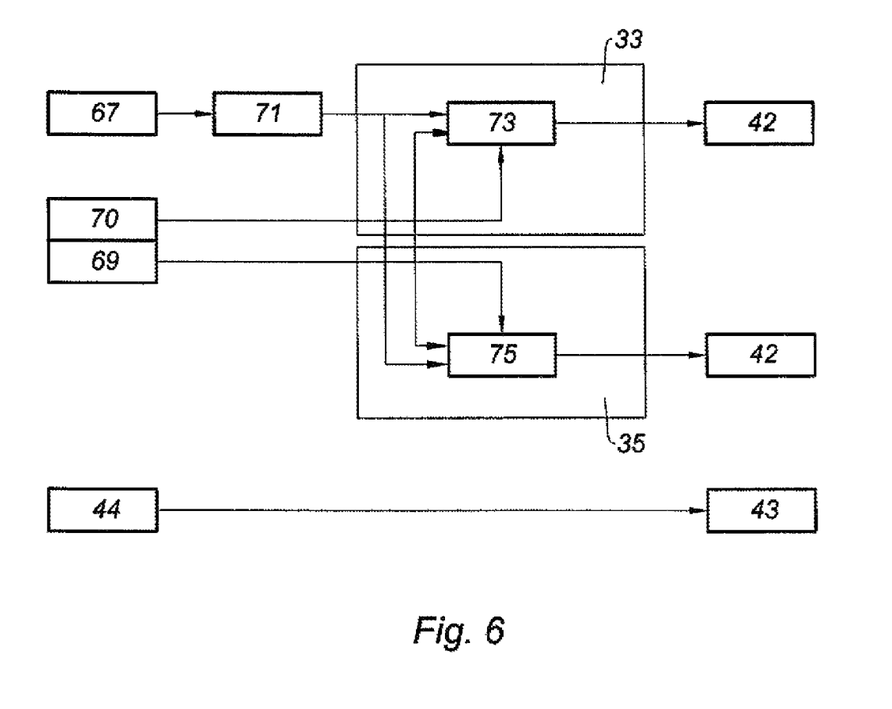
FIG. 6 is a diagrammatic illustration of an embodiment of the locking means belonging to a control system associated with the actuating system according to the invention.

Thus, according to an embodiment shown in FIG. 6, the primary and secondary bolts 42 and tertiary bolts 43 used in the context of the invention are electrically controlled separately and independently so as to ensure optimal security in case of breakdown according to the aeronautics regulation (cs25-933). This regulation requires protection of the control systems of the thrust reversers against risks of untimely deployment by placing three lines of defense ensuring locking and an unlocking activation system whereof the command must be separate and independent, according to a segregation principle.

The tertiary bolt 43 is controlled by a first aircraft computer 44 including a means for locking or unlocking said bolt 43. The first aircraft computer can process the data from the aircraft, such as the altimetrics data or data representative of the weight exerted on the wheels of the landing gear.

Regarding the primary and secondary bolts 42, the latter can be controlled via sensors.

The primary and secondary bolts 42 and/or the sensors are connected to the two control units 33 and 35. The two control units 33 and 35 can each include logic synchronization means able to trigger the actuation of said primary bolt 42 in a synchronized manner. To that end, said synchronization means are connected to each other. According to one alternative, it is possible to use one logic synchronization means in place of two. These synchronization means are each connected to a second aircraft computer 67 able to process data coming from the aircraft, and also to one or more nacelle computers 69 and 70 able to process data from the turbojet engine 5.

The second aircraft computer 67 and the nacelle computer 69 and 70 can be outside the control units 33 and 35, which makes it possible to further improve the security of the control system of the primary and secondary bolts 42.

The second aircraft computer 67 typically processes aircraft data not related to the turbojet engine, such as altimetrics data or data representative of the weight exerted on the wheels of the landing gear.

According to another embodiment, the nacelle computer(s) 69 and 70 can be configured to synchronize the position control of the motors 16 by an electrical command.

In order to tolerate simple electrical breakdowns, the nacelle computer 69 and 70 can comprise two independent electrical sources or two independent and autonomous internal paths. In the latter case, each path can comprise an interface with a unique electrical source, a set of inverters 40 that controls at least half of the electrical motors 16, an electronic steering card of the inverters 40 and their management, an electrical activation and control device for the mechanical maintenance of the structure for the variable nozzle function, an electrical activation and control device for the maintenance of locking means 42, 43, a communication interface with a nacelle computer, a communication interface between the two paths of the nacelle computer 69, 70.

This computer architecture makes it possible to make the control system tolerant to a loss of an electrical power source while preserving the performance of the control system, a loss of one or a set of inverters of the same path, a loss of activation (open circuit) of an electrical actuator motor, a loss of mechanical transmission of two adjacent actuators or a loss of a maintenance device.

Thus, advantageously, the nacelle computer 69 and 70 does not need any electronic redundancy and the number of components is reduced.

To keep the secondary nozzle in position, one or both nacelle computers 69 and 70 can steer and keep the nozzle flaps in the desired position. More advantageously, the nacelle 1 can also comprise a mechanical maintenance device immobilizing the movement of the actuators 15 to improve the output, compactness and reliability of the control system. This function can be of the "zero current brake" type in order to maintain the locking without electricity consumption, the availability being ensured by the double steering of the control member of the brake by the nacelle computers 69 and 70.

In the case of FIG. 6, each internal stop means 73 and 75 is connected to a nacelle computer 69 and 70. It is also possible for a nacelle computer 69 and 70 to comprise two distinct sub-units each able to control an internal stop means 73 and 75 independently.

In the case where the control units 33 and 35 comprise one or more logic synchronization means, the output(s) of the nacelle computer(s) 69 and 70 are connected to an input of the logic synchronization means, which in turn connect an internal stop means 73 or 75. In other words, the order to "close" or "stay open" intended for the internal stop means 73 and 75 passes through the synchronization means in order to synchronize the opening or closing of said internal stop means 73 and 75. Security systems are arranged so as to prevent any untimely operation of one or more primary and secondary bolts 42.

To that end, an external stop means 71 is inserted between the control units 33 and 35 and the second aircraft computer 67. Furthermore, each control unit 33 and 35 includes an internal stop means 73 and 75 arranged inside said units 33 and 35 and also connected to the external stop means 71.

The internal 73 and 75 and external 71 stop means act as switches by allowing or prohibiting the passage of the locking or unlocking orders towards the primary bolts 42. In this perspective, the internal 73 and 75 and external 71 stop means can comprise a control member and a switch. Said control member can then be directly connected to the output of the computer(s) 67 or 69 and 70 and/or to the synchronization means.

The second aircraft computer 67 and the nacelle computer 69 and 70 both act on the opening or closing of the internal stop means 73 and 75.

Moreover, to decrease any risk of untimely actuation of a primary or secondary bolt 42, the second internal stop means 73 and 75 are electrically connected.

Thus, in the event it is necessary to actuate the two primary and secondary bolts 42, the second aircraft computer 67 sends an order to close the external stop means 71.

For the internal stop means 73 and 75 to also close, the nacelle computer 69 must also send the same order as the second aircraft computer 67. In that case, the two internal stop means 73 and 75 close, then actuating the primary and secondary bolts 42 via the sensor.

When the external stop means 71 is closed by a faulty order from the second aircraft computer 67 not confirmed by the nacelle computer 69, the two internal stop means 73 and 75 remain open, therefore not triggering the unlocking of the two primary and secondary bolts 42.

If, despite the order from the nacelle computer 69 not to close the internal stop means 73 and 75, one of its inputs sends the order to close an internal stop means 73 and 75, the electronic connection between the two internal stop means 73 and 75 prevents said means from closing.

Although the locking means 42, 43 and the control means thereof, one embodiment of which is illustrated in FIG. 6, are described in connection with the motors and the power supply and control means thereof, it is possible to have locking means 42, 43 and their control means in a nacelle not having a control system including two distinct control units 33, 35, each being configured to control and power at least one motor not powered or controlled by the other control unit.

In case of flight, the thrust reverser is generally kept powered off. As a result, no electrical current passes through the thrust reverser. This makes it possible to prevent an untimely implementation of electronic origin of the thrust reverser.

In the case of nozzle flaps, the electrical power of the nacelle computer 69 and 70 is maintained during flight to make it possible to move the secondary nozzle section. In fact, according to the different cruising powers of the turbojet engine, it is sometimes necessary to vary the secondary air flow and therefore the width of the annular channel 8.

Thus, according to one embodiment, the nacelle computer 69 and 70 incorporates an external control of the primary and secondary bolts 42, to restore the necessary segregation level. This control can be consolidated inside the nacelle computer 69 and 70 by introducing a protective barrier that combines this external command with an order coming from the turbojet engine 5.

Moreover, to comply with security constraints, this control line of the locking means 42, 43 can be confined and isolated from the rest of the nacelle computer 69 and 70.

In order to allow the primary and secondary bolts 42 to be opened even in case of a path loss of the nacelle computer 69 and 70, it is possible for each path, made autonomous, to be able to steer the two primary and secondary bolts 42. In this scenario, the command is consolidated by a logic internal to the nacelle computer 69 and 70 to prevent any untimely activation.

The nacelle computer 69 and 70 can also incorporate a command of the maintenance device of the variable secondary nozzle. To improve the availability, each path of the nacelle computer 69 and 70 can be capable of deactivating all of the maintenance devices.

In another embodiment, the nacelle computer 69 and 70 can be configured to ensure the maintenance of the structure without introducing any additional mechanical device, or the maintenance in position of the variable secondary nozzle can be ensured by suitable steering of the motor in a position loop.

Although the invention has been described with one particular embodiment, it is of course in no way limited thereto and encompasses all technical equivalents of the described means as well as combinations thereof if they are within the scope of the invention.

The invention claimed is:

1. A nacelle for a two-flow jet engine comprising an outer structure defining an annular flow channel for a cold air flow, said outer structure having two mobile panels equipped with an actuator system for actuating a plurality of actuators that move the two mobile panels, said system comprising, for each mobile panel, at least two motors that drive the actuators, wherein the at least four motors for the two mobile panels are controlled and supplied by at least two separate control units, wherein one of the at least two control units provides control and power to at least one motor from each mobile panel that is neither powered nor controlled by the other control unit, and wherein the actuators are mechanically interconnected by a mechanical transmission.

2. The system according to claim 1, wherein the mechanical transmission includes one or more flexible power cables.

3. The system according to claim 1, wherein each actuator is driven directly by a motor.

4. The system according to claim 1, wherein a single actuator or part of the actuators is driven by all of the motors, the other actuators being driven by one or more mechanical transmissions.

5. The system according to claim 1, wherein the at least two control units are powered by two distinct electrical power systems.

6. The system according to claim 5, wherein each control unit delivers sufficient power for a single motor or set of motors connected to the control unit to be able to drive all of the actuators.

7. The system according to claim 1, wherein the at least four motors are electrically synchronized.

8. The system according to claim 1, wherein each control unit includes a control device commanding at least one inverter able to control one or more motors.

9. The nacelle according to claim 1, wherein the mobile panel is a thrust reverser cowl able to move substantially longitudinally.

10. The nacelle according to claim 1, wherein the nacelle includes two thrust reverser cowls.

11. The nacelle according to claim 1, wherein the mobile panel is a nozzle panel pivotably mounted so as to reduce the width of the annular flow channel.

12. The nacelle according to claim 1, wherein the nacelle includes at least one thrust reverser cowl and at least one nozzle panel.

13. The nacelle according to claim 1, wherein the nacelle includes a plurality of mobile panels connected to each other by a mechanical connection so as to allow a substantially synchronized movement of said mobile panels relative to each other.

14. The nacelle according to claim 1, wherein motors of one of the two mobile panels are synchronized in position with motors of the other mobile panel by a synchronization means controlled by the control units.

\* \* \* \* \*